United States Patent
Raevsky et al.

(10) Patent No.: US 6,490,299 B1
(45) Date of Patent: Dec. 3, 2002

(54) METHOD AND LASER SYSTEM FOR GENERATING LASER RADIATION OF SPECIFIC TEMPORAL SHAPE FOR PRODUCTION OF HIGH QUALITY LASER-INDUCED DAMAGE IMAGES

(75) Inventors: Eugene Raevsky, Moscow (RU); Igor Troitski, Henderson, NV (US)

(73) Assignee: Troitski, Henderson, NV (US)

( * ) Notice: Subject to any disclaimer, the term of this patent is extended or adjusted under 35 U.S.C. 154(b) by 308 days.

(21) Appl. No.: 09/621,276

(22) Filed: Jul. 20, 2000

(51) Int. Cl.$^7$ .................................. H01S 3/11
(52) U.S. Cl. ........................ 372/10; 372/25; 372/30
(58) Field of Search ....................... 372/10, 25, 30

(56) References Cited

U.S. PATENT DOCUMENTS

| | | |
|---|---|---|
| 4,092,518 A | 5/1978 | Merard |
| 4,630,275 A | 12/1986 | Rappoport |
| 4,675,872 A | 6/1987 | Popek et al. |
| 4,843,207 A | 6/1989 | Urbanek |
| 4,959,838 A | 9/1990 | Barnes et al. |
| 5,001,716 A | 3/1991 | Johnson et al. |
| 5,206,496 A | 4/1993 | Clement |
| 5,293,389 A | 3/1994 | Yano et al. |
| 5,339,323 A * | 8/1994 | Hunter et al. ............ 372/25 |
| 5,343,483 A | 8/1994 | Farrell et al. |
| 5,363,387 A | 11/1994 | Sinofsky |
| 5,575,936 A | 11/1996 | Goldfarb |
| 5,637,244 A | 6/1997 | Erokhin |
| 5,640,412 A | 6/1997 | Reed |
| 5,661,748 A | 8/1997 | Zahavi et al. |
| 5,675,596 A | 10/1997 | Kong et al. |
| 5,721,749 A | 2/1998 | Holleman |
| 5,832,013 A | 11/1998 | Yessik |
| 5,886,318 A | 3/1999 | Vasiliev et al. |
| 5,963,575 A | 10/1999 | Muller et al. |

FOREIGN PATENT DOCUMENTS

| | | |
|---|---|---|
| EP | 07 43 128 A1 | 5/1995 |
| RU | 321422 | 11/1970 |
| RU | 20082288 C1 | 2/1994 |
| SU | 1838163 | 3/1992 |
| WO | WO 96/30219 | 3/1995 |

* cited by examiner

Primary Examiner—Paul Ip
Assistant Examiner—Leith Al-Nazer

(57) ABSTRACT

Embodiments of methods and an apparatus for generating a specific laser radiation for production of high quality laser-induced damage images are disclosed. One or more embodiments of the invention comprise a method and system for generating the specific laser radiation by serial combination of both generation regimes: a Q-switched mode and a free-running mode. According to the invention the combination of both regimes is produced during a single flash of a pulsed pumping source by successive switching a loss level in a resonant cavity. Desirable ratio of a Q-switched pulse energy and a free-running mode pulse energy is achieved by adjusting the time delay of Q-switching and the threshold level in the resonant cavity. A Q-switched pulse creates laser-induced breakdown and a free-running pulse maintains plasma of the breakdown as long as it is necessary to create a damage of a desirable size.

5 Claims, 3 Drawing Sheets

METHOD AND LASER SYSTEM FOR GENERATING LASER RADIATION OF SPECIFIC TEMPORAL SHAPE FOR PRODUCTION OF HIGH QUALITY LASER-INDUCED DAMAGE IMAGES

FIELD OF THE INVENTION

The present invention relates to a method and apparatus for producing laser-induced damage points in transparent objects for use in generating high quality images.

BACKGROUND OF THE INVENTION

A number of techniques for creating a variety of patterns on the surface and inside of transparent substrates using pulsed laser radiation are well known.

One publication disclosing such techniques is the Russian invention #321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al. discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre- programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

U.S. patent application Ser. No. 08/643,918 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. patent application Ser. No. 09/583,454 to Troitski discloses a method and system for producing etch points by control of breakdown process development. At the beginning an applied laser radiation level just exceeds an energy threshold for creating a plasma condition in the material, and thereafter the energy level of the applied laser radiation is just maintain the plasma condition and is applied before the plasma condition extinguishes, but after a shock wave associated therewith has passed. Another method for production etch points by controlling a space structure of laser beam. A laser generates a $TEM_{mn}$ radiation and the values of the integers m and n are controlled and determined so as to reproduce particular gray shades for a particular point of an image.

From Patents mentioned above, it is possible to conclude that laser-induced damages used for creation of images are preferably produced by a Nd-YAG laser operating at a wavelength of 1064 nm. The energy density of each pulse is sufficient to induce localized ionization of the material at the focus of the beam. U.S. Pat. No. 5,637,244 is specially recommends to use a solid-state Q-switched laser. U.S. Pat. Nos. 5,206,496 and 5,575,936 recommend to use laser pulses with length of 10 nsec. Soviet Patent publication 1838163 and EPO Patent Document 0743128 disclose methods of induced-damage image production by using a repetition of laser pulses for creation of each pulse. All this performance requirements are found in many kinds of commercial Nd-YAG lasers. However, U.S. patent application Ser. No. 09/583,454 to Troitski discloses a method accordance to which for production of high quality laser-induced damage images, it is reasonable to create plasma (to produce breakdown) by a power laser pulse of short pulse duration and after to maintain the plasma by smaller power laser pulses of longer pulse width. For using the method, the more composite laser systems should be used. The usable laser systems are disclosed in following Patents.

U.S. Pat. No. 4,630,275 to William R. Rapoport discloses a slowly Q-switched laser. The apparatus and method permit controlled laser pulse amplitude, as well as shorter time intervals between pulses and narrower (wavelength) line widths than are possible with conventional Q-switching. In addition, reduced peak power results in less likelihood of damage to the laser medium or optical elements.

U.S. Pat. No. 4,675,872 to Mare H. Popek et al. discloses a system based of a Q-switch driver for controlling laser output pulses, so that the laser output pulses are of equal amplitude approximately. Sequences of light request pulses, each such light request pulse for causing the laser to produce a laser output pulse, are input to the Q-switch driver.

U.S. Pat. 4,959,838 to Norman P. Barnes et al. discloses a method, which overcomes the limitations of the prior art by providing a circuit for producing laser energy more efficiently and with a shaped or controlled output pulse length. The circuit contains a laser medium in a laser resonator that includes a Q-switch and a polarizer, which act in combination to control the loss of the resonator and provide the laser output representative of such loss. An optical diode senses the level of the output pulse and provides an output signal that when amplified is used with a control voltage from a supply provide a control signal which is applied to the Q-switch to control the shape of the output pulse by adjusting its length.

U.S. Pat. No. 5,001,716 to Bertram C. Johnson et al. describes a Q-switch for a laser having a resonant cavity including an output coupler, a pain medium and a retro-reflecting mirror is mounted in the resonant cavity between the gain medium and the retro-reflecting mirror. The Q-switch comprises a polarizer and a phase retarding elements, which includes a birefringent substrae, for inducing a controllable phase retardation in the cavity mode in response to an applied electric field.

U.S. Pat. No. 5,293,389 to Makoto Yano et al. discloses a method and a device for generating a multi-pulse laser beam including at least three laser beams, from a single pulse laser beam oscillated from a single laser beam source and a method and an apparatus using the pulse generator for laser beam machining with a two-wavelength multi-pulse laser beam suitable for fine-patterning a multi-layered circuit board formed of metal thin films and resin layers or ceramic bodies.

U.S. Pat. No. 5,339,323 to John Hunter et al. discloses a laser system controlling laser pulse energy by feedback to the laser Q-switch. A light detector develops a feedback signal in response to the emitted light and a controller places the Q-switch in its high loss state for a time duration dependent on the feedback signal and an energy setpoint.

U.S. Pat. No. 5,343,483 to Patrick V. Farrell et al. provides a Q-switch control circuit for operation with a laser light source including a Pockels cell and a flash lamp. Double laser light pulses are produced from a single laser by turning a single Pockels cell on and off in rapid succession during a single flash lamp e[citation of the laser. Pulses of the duration and spacing provided by the Q-switch control circuit are well suited for use with Nd:YAG lasers,and allow fast double pulsing for photographic applications.

U.S. Pat. No. 5,363,387 to Edward L. Sinofsky discloses a variable pulsewidth laser system, which employs on oscillating reflector to control the duration of laser pulses. The oscillating mirror is swept about an axis distinct from the optical axis, such that resonant conditions suitable for laser beam generation occur only at a particular location in the oscillating sweep path. By varying the scanning waveform, laser pulses of different durations can be generated.

U.S. Pat. No. 5,640,412 to Edward D. Reed describes a prism folded laser cavity with controlled intractivity beam polarization. The index of refraction and the orientation of the prisms are selected to induce a predetermined phase delay between the two orthogonal polarization components of the linearly polarized intracavity beam. An electro-optic Q-switch cell is intermittently turned "on" whereby a second predetermined phase delay is induced onto the intracavity beam.

U.S. Pat. No. 5,661,748 to Dov Zahavi et al. disclose a device for extending the duration of a light pulse by a factor of an integer or by a factor which differs from an integer. The light pulse is passed through a device which divides the initial beam into a number of parts, where the first part passes unhindered while the subsequent parts of the beam are retarded and pass through the system after various delay period, resulting in the desired extension of the pulse duration.

U.S. Pat. No. 5,675,596 to Hong-Jin Kong et al. discloses a passively Q-switched laser with a dual-cavity configuration. The laser employing a passive Q-switching and an auxiliary cavity for lasing the light emitted from the passive Q-switching, enables the pulse width to be varied and a short and symmetrical laser pulse to be emitted without incidental equipments.

U.S. Pat. No. 5,721,749 to Gerald W. Holleman et al. discloses a method and apparatus for controlling the form and timing of pulses emitted by a high-power solid-state laser, without the need for complex feedback circuits. The width and peak intensity of relaxation pulses emitted by the laser are controlled by use of an acousto-optic modulator installed in the laser cavity, to lock the relaxation pulses to the frequency of radio-frequency control signals applied to the modulator. The number of pulses and the average rate, at which the pulses are emitted from the laser are independently controlled by varying the duty cycle of diodes used to pump solid-state amplifiers installed in the laser cavity.

U.S. Pat. No. 5,832,013 to Michael J. Yessik disclose an intracavity modulated pulsed laser, which comprises an amplification medium, a pulsed pumping source, a beam modulator, and two mirrors, one totally reflective and one partially reflective for generating at least one laser output burst comprising a plurality of sub-pulses having variably controllable peak powers. The laser is both efficient and capable of delivering an output comprising a plurality of output bursts, each comprising a plurality of sub-pulses having substantially increased and controllable peak powers.

U.S. Pat. No. 5,963,575 to Gerhard Muller et al. discloses a Q-switched laser system. The effect achieved with the system is that, not only can the pulse duration of the laser system be altered cost-effectively in broad ranges as a function of the length of the waveguide but that simultaneously achieved are a smoothing of the disadvantageous, statistical intensity oscillations, which occur during a laser pulse and lead to increased fiber wear, and homogenization of the spatial intensity profile with suppression of excessive intensity elevations in the beam cross-section.

Patents mentioned above disclose methods and systems, which are capable to control the number and average rate of laser pulses independently, to control the duration of laser pulses and to obtain a symmetrical laser pulse with a short and variable pulse width. The system permit to generate a multi-pulse laser beam and to shape laser output pulses. All these system give a chance only to approach temporal structure of laser radiation to that, which is needed for production of premium laser-induced damage images but they do not permit to generate that temporal structure of laser beam which really permit to produce high quality images. The needed temporal structure should have following properties:

1. The first laser pulse should initiate plasma inside a work material; secondary laser radiation should maintain plasma condition.
2. The first laser pulse should have time duration about 10–20 ns and its energy should be a little large than threshold energy inside the material.
3. The secondary laser radiation should be generated after the general shock wave created by the first pulse is finished.
4. The time duration of the secondary laser radiation should be much longer than the first pulse width.
5. The energy density and duration of the secondary laser radiation determine size of laser-induced damage and thereby its brightness.
6. The first pulse and secondary laser radiation should be repeated as many times as the number of etch points containing at the image.

It is important to notice, since the size of damages determines their brightness, it is necessary for production gray shades images to control the energy density and duration of the secondary radiation during production. Control of the first pulse energy and of time domain between the first pulse and the secondary radiation is necessary, when the work material is replaced by another material.

SUMMARY OF THE INVENTION

The present invention has its principal task to provide a method and apparatus for generating laser radiation of specific temporal shape for production of high quality laser-induced damage images.

One or more embodiments of the invention comprise a method for generating succession of plenty pairs of laser pulses, one of them is a short power laser pulse creating breakdown inside work material, and another is a long less power laser radiation maintaining the plasma conditions inside the work material, by combination of two generation regimes: Q-switched mode and free-running mode.

One or more embodiments of the invention comprise a laser system for generating succession of pulse pairs so that every pair contains a high peak power, short laser pulse and a low peak power, long laser radiation generated during the same pump pulse and so that energy of each pulse and time interval between these pairs pulses are controlled during generation of the succession.

Further objects, features, and advantages of the present invention over the prior art will become apparent from the detailed description of the drawings, which follows, when considered with the attached figures.

DETAILED DESCRIPTION OF THE INVENTION

The invention comprises method and apparatus for generating specific laser radiation for production of high quality laser-induced damage images so that every etch point of the image is created by two pulses: the first creates plasma at the point, the second maintains the plasma as long as a damage of desirable size is produced. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

A method of the present invention is based on combination of two regimes of generation: Q-switched mode and free-running mode. To provide a better understanding of the essence of the method it is expedient first to consider the process of laser generation and general dynamical phenomena, which are attendant to it.

Figure 1:
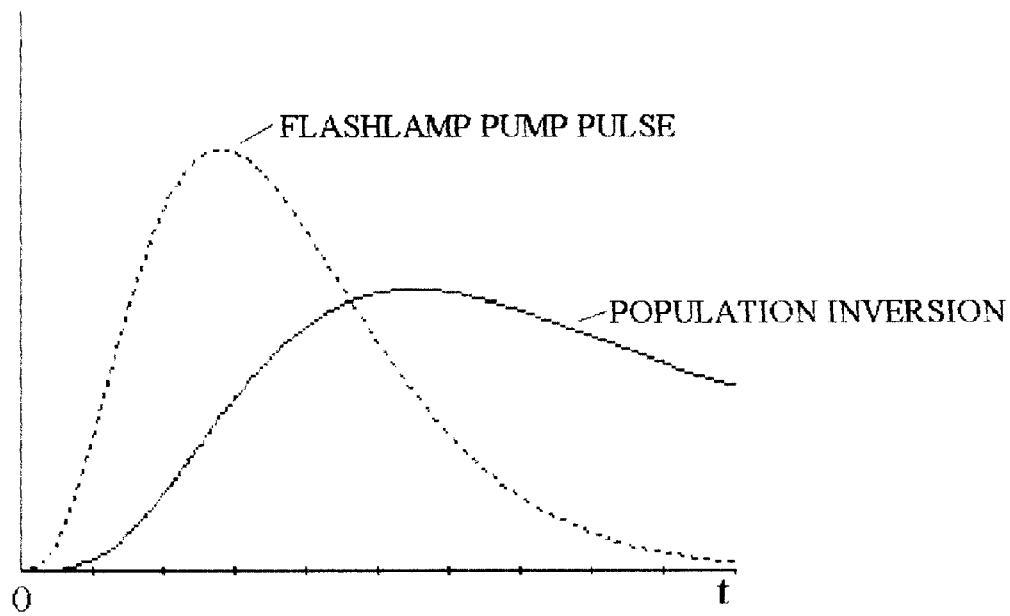
FIG. 1 shows a timing diagram of flash-lamp light intensity and: corresponding population invention in an active medium.

FIG. 1 illustrates a timing diagram of the pump light intensity and corresponding timing diagram of population inversion in the active medium.

Figure 2:
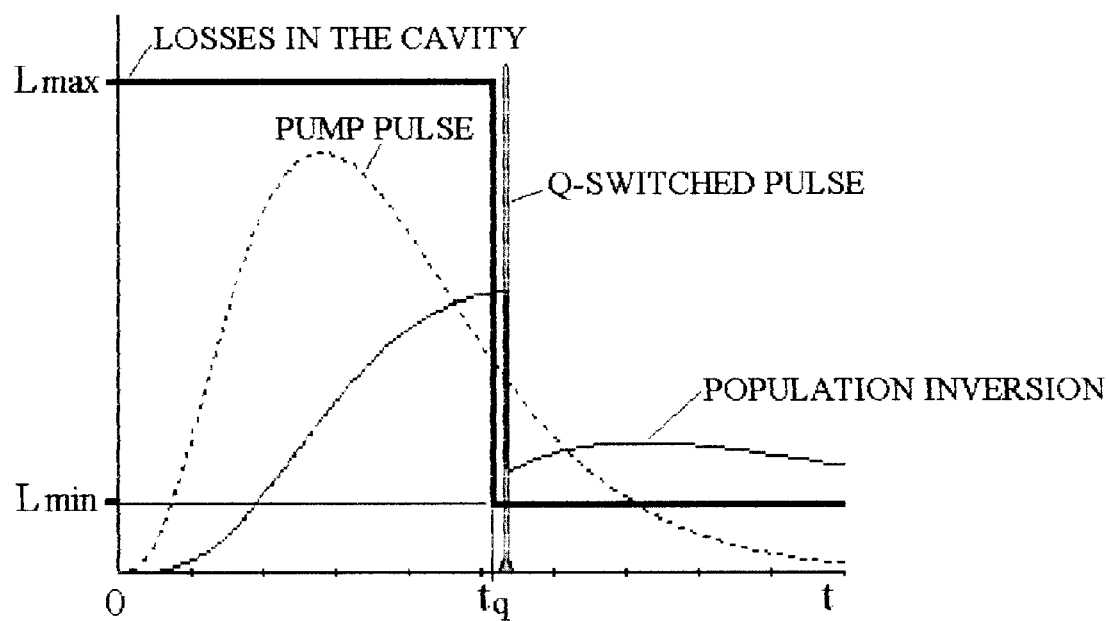
FIG. 2 shows a timing diagram of a Q-switched laser pulse development; $L_{max}$ is initial loss in a cavity, $t_q$ is a point of time when losses in the cavity are switched to minimal level $L_{min}$.

FIG. 2 shows process of the generation of a Q-switched pulse. At the beginning, the initial loss level equals to value of $L_{max}$, and lasing action is prohibited. At the moment of time $t_q$, the loss level is switched to its minimum $L_{min}$. After the buildup time, the Q-switched pulse is emitted.

Figure 3:
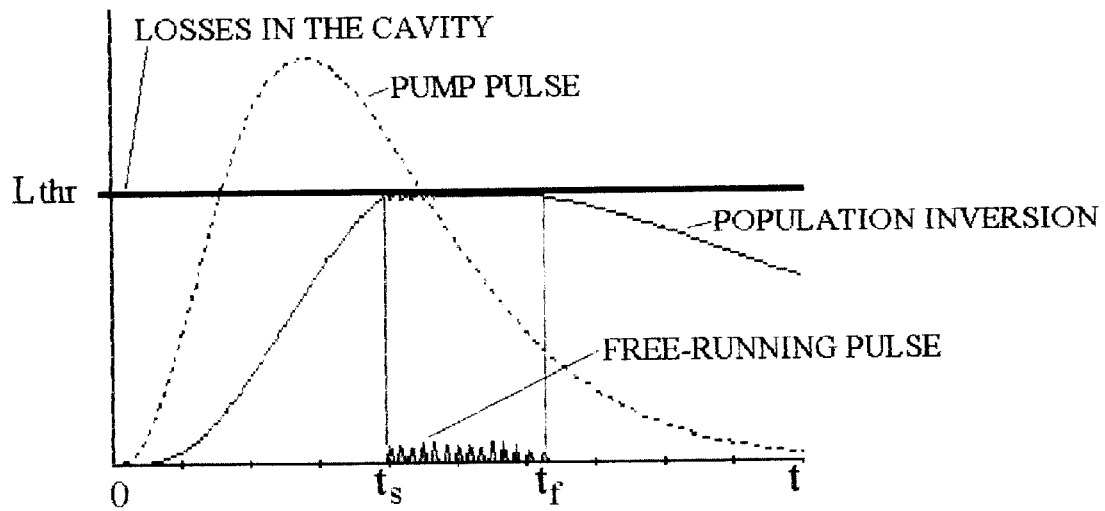
FIG. 3 shows a timing diagram of a free-running pulse development; $L_{thr}$ is a threshold loss level, $t_s$ is a point of time when population inversion reaches threshold level and free-running pulse generation is begun, $t_f$ is a point of time when free-running pulse generation is completed.

FIG. 3 shows the development of a long laser pulse in the free-running mode. Free-running pulse is emitted at time $t_s$, when the population inversion reaches a threshold level $L_{thr}$. Laser oscillation is ended at the moment $t_f$, when pumping rate falls, and the population inversion in the active medium is dissipated by spontaneous emission.

Figure 4:
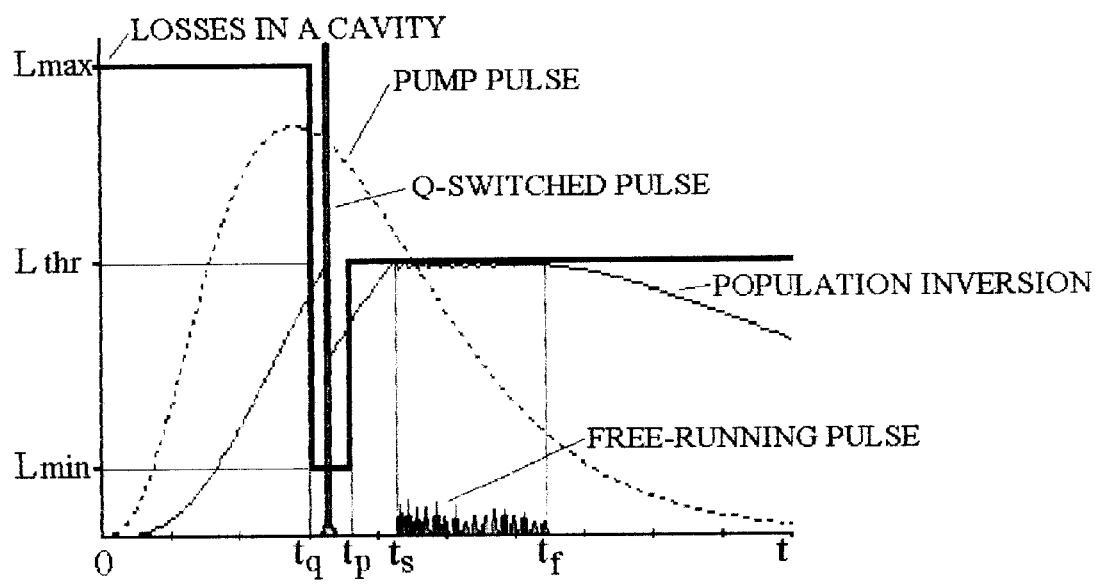
FIG. 4 shows a development timing diagram of a Q-switched pulse and a free-running pulse during a single flash of a pulsed pumping source according to the present invention; $t_q$ is a point of time when the loss level is switched to its minimum $L_{min}$ and the Q-switched pulse is emitted; $t_p$ is a point of time when the cavity losses are increased to threshold level; $t_s$ is a point of time when pump radiation causes the population inversion to reach the threshold level $L_{thr}$ and the free-running pulse is emitted; $t_f$ is a point of time, when pumping rate falls and laser generation is ended.

FIG. 4 shows as in accordance with the present invention both modes of generation mentioned above are combined during a single flash of a pumping source. At the moment $t_q$, the loss level is switched to its minimum $L_{min}$ and the Q-switched pulse is emitted. After the end of the Q-switched pulse, the cavity losses are increased to threshold level. At the moment $t_s$ pump radiation causes the population inversion to reach the threshold level $L_{thr}$ and the free-running pulse is emitted. Laser oscillation is ended at the moment $t_f$, when pumping rate falls, and the population inversion in the active medium is dissipated by spontaneous emission. The desired ration of Q-switched pulse energy and free running pulse energy is provided by variation of the time delay to Q-switching and the threshold level $L_{thr}$.

For production high quality laser-induced damage images, it is necessary to control the energy $E_q$ of the Q-switched pulse, time domain $T_{qf}$ between the completion of the Q-switched pulse and the rise of the free-running pulse, the energy $E_f$ of the free-running pulse and the time duration $T_f=t_f-t_s$ of the free-running pulse. The values of parameters $E_q$ and $T_{qf}$ depend on the work material and should be controlled before production. The values of parameters $E_f$ and $T_f$ determine the size of laser-induced damage and should be controlled during duration. All these parameters are regulated by the pump pulse energy, the pump pulse duration, the time of Q-switching, the threshold loss levels $L_{min}$ and $L_{thr}$.

A method for generating a succession of a pair of laser pulses for production of high quality laser-induced damage images inside a transparent material by serial combination of two generation regimes: Q-switched mode and free-running mode in accordance with this embodiment of the invention is as follows:

Step 1: The temporal shape and energy of the pump pulse are determined so that the corresponding value of population inversion provides the desirable summary energy of two output pulses (Q-switched mode and free-running mode) generated during a single pump pulse.

Step 2: The time of Q-switching $T_q$ is determined so that energy of the Q-switched pulse is sufficient to initiate breakdown inside the work material.

Step 3: The threshold loss level $L_{thr}$ is determined so that the time duration $T_{qf}$ between the completion of the Q-switched pulse and the start of the free-running pulse is a little longer that existence time of general shock wave induced inside the work material by breakdown.

Step 4: The pump pulse duration is determined so that the free-running pulse duration $T_f$ is sufficient to produce a laser-induced damage of maximal desirable size.

Step 5: In accordance with the obtained parameters (the temporal shape and energy of the pump pulse, the time of Q-switching $T_q$), Q-switched pulse is generated.

Step 6: After the completion of the Q-switched pulse, the loss level is switched to the threshold value $L_{thr}$ providing right energy $E_f$ and duration $T_f$ of the free-running pulse.

Step 7: The free-running pulse is generated during the time interval $T_f$ corresponding to desirable damage size.

Step 8. After the completion of the free-running pulse, the loss level is switched to the initial level $L_{max}$.

Generation of successive pairs of pulses is realized by repetition of Steps 5–8. The threshold value $L_{thr}$ of Step 6 is varied for every pulse pair depending on desirable damage size.

Figure 5:
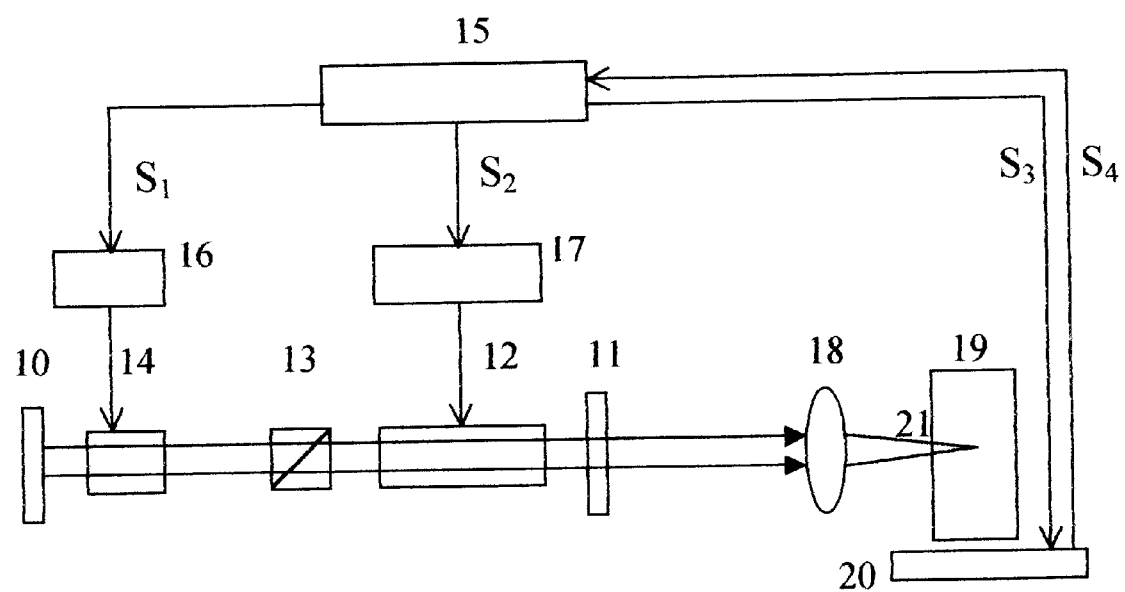
FIG. 5 is an exemplary block-diagram of a laser system of the invention for production of high quality laser-induced damage images by combination of a Q-switched mode and a free-running mode during a single flash of a pulsed pumping source; 10 is a high reflection mirror; 11 is an output coupler; 12 is an active medium; 13 is a polarizer; 14 is an electro-optic cell; 15 is a computer; 16 is a driver; 17 is a pulsed pumping source; 18 is a focused optical system; 19 is an article; 20 is a positioner; 21 is a point inside an article, $S_1$, $S_2$, $S_3$ are signals of a computer 15 to a driver 16, a pulsed pumping source 17 and a positioner 20 respectively; $S_4$ is a signal of a positioner 20 to a computer 15.

Other embodiments of the invention comprise a laser system for generating succession of pulse pairs so that every pair contains a high peak power, short laser pulse and a low peak power, long laser radiation generated during the same pump pulse and so that energy of each pulse and time interval between these pairs pulses are controlled during generation of the succession. Reference is now made to FIG. 5, which shows in block-diagram form a pulsed laser system for production of high quality laser images in accordance with the present invention.

A high reflection mirror 10 and an output coupler 11 are formed a resonant cavity. An active medium 12 (such as a rod of Nd:YAG), and a polarizer 13 are placed inside the cavity. The Q-switches comprises an electro-optic cell 14 such as Pockels cell. Driver 16 is connected to the electro-optic cell to operate the Q-switch. A pulsed pumping source 17 creates population inversion in the active medium 12. The output laser radiation is focused by an optical system 18 at specified point 21 of the work article 19. A positioner 20 is used to displace focal area 21 inside the article 19.

At point of time to signal $S_2$ of computer 15 switches on a pulse pumping source 17. At the same time $t_0$ signal $S_1$ of computer 15 switches on a driver 16 providing the bias voltage to hold-off lasing action in a cavity.

The polarizer 13 produces an intracavity beam linearly polarized in a preferred direction, and effectively ejects the polarization component orthogonal to the preffered polarization direction. The electrooptical cell 14 is oriented so that the fast and slow axes are 45° from the direction of preferred polarizaton component passed the polarizer 13. The electrooptical cell 14 and polarizer 13 combinations provide the intracavity loss. The phase retardation induced by the electrooptical cell 14 is proportional to the bias voltage of magnitude V. The variation of the cavity loss $L_v$ introduced by the Q-switch can written in the form $$L_V = -\frac{1}{l}\ln\left(\cos\left(\frac{\pi}{2}\frac{V}{V_{\lambda/4}}\right)\right)$$

where l is the length of the active medium, $V_{\lambda/4}$ is the quarter-wave voltage.

At moment of time $t_q$ signal $S_1$ of computer 15 switches the voltage on the electrooptical cell 14 to zero, permitting the polarizer 13 and electrooptical cell 14 combinations to pass a linearly polarized beam without loss. Oscillations within the cavity will buildup, and a Q-switched pulse will be emitted from the cavity. At moment of time $t_p$ signal $S_1$ of computer 15 switches a bias voltage of a driver 16 providing the loss level to obtain free-running lasing. After the point of time $t_f$, signal $S_3$ permits the positioner 20 displaces the article 19 so that the laser beam is focused at the next point 21 inside the work material. When the movement of the article 19 is finished, signal of positioner 20 $S_4$ permits to repeat the circle of generation the next pair of pulses in the Q-switched mode and the free-running mode again.

We claim:

1. A method for production of high quality laser-induced damage images inside a transparent material, comprising the steps of:

providing the transmission in rapid succession of two laser output pulses one of which is a Q-switched pulse, and another is a free-running pulse to the location of a damage;

adjusting a summary energy of said output pulses to create laser-induced damages of desired sizes;

adjusting the time interval between said output pulses so as it is longer than the existence time of the general shock wave induced by the laser-induced breakdown inside the work material;

controlling the said second laser pulse width for creation of the laser-induced damage of the required size;

adjusting the ratio of the said Q-switched pulse energy to the said free-running pulse energy so as the first laser pulse of the said pair initiates plasma inside work material and the second laser pulse of the said pair maintains plasma condition for production of the right gray shades of the etch points.

2. The method in accordance with claim 1 wherein a pair of said pulses is obtained using a Q-switched flash-lamp pumped laser during a single flash of a pulsed pumping source by successive switching the loss level with the said Q-switch from the maximum level to the minimum level providing generation of a Q-switched pulse and to the intermediate threshold level providing generation of a free-running pulse.

3. The method in accordance with claim 2 wherein the time interval between the said Q-switched pulse and the said free-running pulse is provided by a variation of the threshold loss level and time of switching loss level.

4. The method in accordance with claim 2 wherein the desired ratio of the said Q-switched pulse energy to the said free-running pulse energy is provided by a variation of the threshold loss level, time of switching loss level and the pulse width of the flash lamp pulse.

5. A laser system for generating succession of two laser output pulses one of which is a Q-switched pulse, and another is a free-running pulse during a single flash of a pulsed pumping source, comprising:

a laser having a resonant cavity including a high reflection mirror, an output coupler, and an active medium, a pulsed pumping source for exciting said active medium to create a laser beam inside said cavity;

means for varying the pulse width of the said pulse pumping source;

a polarizer means inside said cavity for polarizing said laser beam;

an electrooptical cell inside said cavity for producing a phase retardation to said laser beam in response to a bias voltage; said electrooptical cell and said polarizer are acted in combination to control the loss level of the said resonant cavity;

a Q-switch driver means for providing a bias voltage for placing the said loss level in the maximum level to prevent the lasing action, in the minimum level providing generation of a Q-switched pulse, and for placing loss level in the intermediate threshold level providing generation of a free-running pulse.

* * * * *